C. W. SVENSON.
DUST CAP FOR WHEEL HUBS AND THE LIKE.
APPLICATION FILED FEB. 9, 1914.
1,135,960.
Patented Apr. 13, 1915.
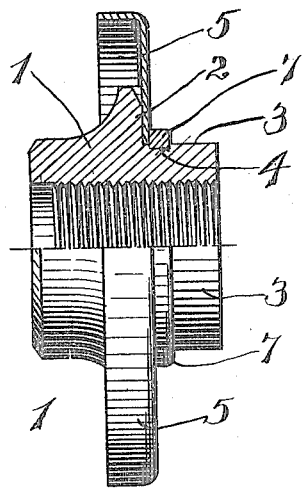
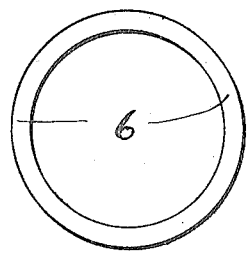
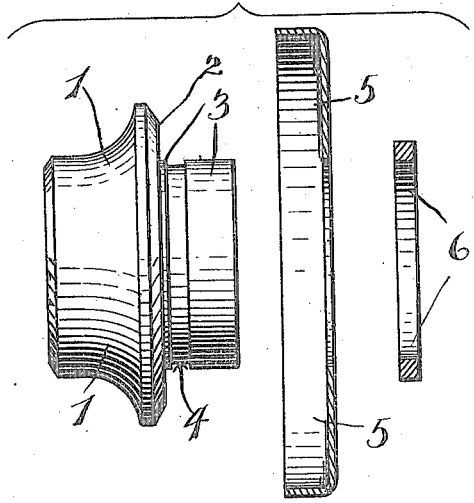
Witnesses:
Inventor
C. W. SVENSON

UNITED STATES PATENT OFFICE.

CHARLES WALFRID SVENSON, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

DUST-CAP FOR WHEEL-HUBS AND THE LIKE.

1,135,960. Specification of Letters Patent. Patented Apr. 13, 1915.

Application filed February 9, 1914. Serial No. 817,450.

*To all whom it may concern:*

Be it known that I, CHARLES W. SVENSON, a citizen of the United States, residing at New Britain, county of Hartford, State of Connecticut, have invented certain new and useful Improvements in Dust-Caps for Wheel-Hubs and the like, of which the following is a full, clear, and exact description.

The present invention has reference more particularly to a mounting for dust caps and other similar end closures.

One specific application of a dust cap can be found in the case of wheel hub construction and I am illustrating in the accompanying drawings a preferable embodiment of my invention as applied to an end bearing sleeve of a wheel hub structure.

In the drawings: Figure 1 is a view in side elevation, half in section, showing a dust cap mounted upon an end bearing sleeve in accordance with the present invention. Figs. 2 and 3 are respectively end and side elevations of the locking ring for the dust cap before deformation. Fig. 4 is a view in side elevation, partly in section, showing the sleeve, cap and locking ring before assembling.

Referring to the drawings by numerals, 1 indicates the curved bearing face of an interiorly threaded sleeve arranged to thread upon a supporting spindle of a wheel hub construction, and to be positioned at one end of the hub thereof, the curved surface 1 of the sleeve forming the race-way of the usual ball bearing, such as is well known in the art, one illustration of such a wheel hub construction being the Glover Patent No. 961,225, dated June 14, 1910.

Intermediate its ends the sleeve is provided with an annular abutment flange 2, the sleeve being reduced in diameter from the outer face of said flange outwardly as at 3, and intermediate the outer flange face and its outer end being provided with an annular groove 4 therein. 5 designates a cupped "dust cap" which in the case of a wheel hub, forms a closure for the otherwise open end of the hub. This dust cap engages the outer face of the abutment flange 2, and as previously constructed has been retained thereagainst by means of a washer or other element threading on the exteriorly threaded periphery of the sleeve and engaging the outermost face of the dust cap. This has necessitated the extra operation of exteriorly threading the sleeve and of providing a threaded washer. I dispense with the necessity of threading the outer periphery of the sleeve for this purpose alone by seating a locking member in the groove 4 so that the dust cap is permanently held on the sleeve and there is not the possibility of losing the cap when the washer or other element of the coaster structure is removed. In order to make this holding means permanent, I employ an endless solid ring 6 having an internal diameter corresponding substantially with the external diameter of the end portion 3 of the sleeve and by means of suitable tools or machinery, as for instance, a press, force the ring 6 over the end of the sleeve and by pressure deform the same in the groove 4 and against the outer face of the dust cap 5, this deformation of the ring decreasing its internal diameter so that it extends within the edges of the groove and is held firmly thereby in fixed position on the sleeve so that the dust cap is permanently attached.

In the drawings, Fig. 1, I have designated the deformed ring by the numeral 7. The ring 6 before deformation will preferably have a snug fit on the end 3 of the sleeve and the groove 4 will be comparatively shallow to admit the practical deformation of the washer to accomplish the ends recited.

While I have herein described a preferable embodiment of my invention, it will be understood that the dust cap construction is not limited to the specific type of sleeve shown, but that the invention may be varied in structure and relative arrangement of parts within the spirit of the invention and the scope of the appended claims.

What I claim, therefore, and desire to secure by Letters Patent is:

In a device of the character described, a circular sleeve having an external shouldered portion thereon extending radially outward therefrom and having an annular groove therein adjacent said shoulder and of less diameter than said sleeve, said groove providing opposite side walls, and a closure element seated on said sleeve against said shouldered portion, with a solid circular ring member on said sleeve and extending partially within and uniformly around said groove engaging the opposite side walls thereof to retain said closure element on said sleeve between said ring and said shoulder.

CHARLES WALFRID SVENSON.

Witnesses:
 GEO. P. SPEAR,
 M. G. STRONG.

Copies of this patent may be obtained for five cents each, by addressing the "Commissioner of Patents, Washington, D. C."